United States Patent
Ren et al.

(10) Patent No.: US 10,402,018 B2
(45) Date of Patent: Sep. 3, 2019

(54) LIGHT-SENSITIVE TYPE TOUCH PANEL, DISPLAY DEVICE AND TOUCH POSITIONING METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Jinyu Ren, Beijing (CN); Yongzhi Song, Beijing (CN); Bo Zhou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/540,489

(22) PCT Filed: Jun. 1, 2016

(86) PCT No.: PCT/CN2016/084302
§ 371 (c)(1),
(2) Date: Jun. 28, 2017

(87) PCT Pub. No.: WO2017/152517
PCT Pub. Date: Sep. 14, 2017

(65) Prior Publication Data
US 2018/0074652 A1 Mar. 15, 2018

(30) Foreign Application Priority Data
Mar. 9, 2016 (CN) .......................... 2016 1 0133263

(51) Int. Cl.
G06F 3/042 (2006.01)
G06F 3/041 (2006.01)
G02F 1/1333 (2006.01)

(52) U.S. Cl.
CPC ........ G06F 3/0421 (2013.01); G02F 1/13338 (2013.01); G06F 3/041 (2013.01); G06F 3/042 (2013.01); G06F 2203/04109 (2013.01)

(58) Field of Classification Search
CPC ........ G06F 3/0421; G06F 3/042; G06F 3/041; G06F 3/0428; G06F 3/0425;
(Continued)

(56) References Cited

U.S. PATENT DOCUMENTS 7,351,949 B2 * 4/2008 Oon ...................... G06F 3/0421
250/221
7,465,914 B2 * 12/2008 Eliasson ............... G06F 3/0414
250/221

(Continued)

FOREIGN PATENT DOCUMENTS

| CN | 102576265 A | 7/2012 |
|----|-------------|--------|
| CN | 103477312 A | 12/2013 |
| CN | 104375719 A | 2/2015 |

OTHER PUBLICATIONS

International Search Report and Written Opinion dated Nov. 23, 2016: PCT/CN2016/084302.

*Primary Examiner* — Dismery Mercedes
(74) *Attorney, Agent, or Firm* — Ladas & Parry LLP

(57) ABSTRACT

A light-sensitive type touch panel, a display device and a touch positioning method are provided. The light-sensitive type touch panel includes: a first thin film on a support substrate; a second thin film opposite to the first thin film in a direction perpendicular to the support substrate; a fluid layer, which is between the first thin film and the second thin film in the direction perpendicular to the support substrate, adjacent to the first surface, which is close to the first thin film, of the second thin film, and has a refractive index smaller than that of the second thin film; a light source configured to emit incident light which is incident to the (Continued)

second thin film; and a light sensor on a side, away from the second thin film, of the first thin film.

19 Claims, 3 Drawing Sheets

(58) Field of Classification Search
CPC ......... G06F 3/0412; G06F 2203/04109; G06F 2203/04104; G02F 1/13338; G02F 1/133504
See application file for complete search history.

(56) References Cited

U.S. PATENT DOCUMENTS

| | | | | |
|---|---|---|---|---|
| 8,013,845 | B2* | 9/2011 | Ostergaard | G06F 3/0421 178/18.09 |
| 8,803,846 | B2* | 8/2014 | Song | G06F 3/0428 178/18.09 |
| 9,035,909 | B2* | 5/2015 | Christiansson | G06F 3/0421 345/175 |
| 9,684,161 | B1* | 6/2017 | Langendijk | G02B 26/005 |
| 9,996,724 | B2* | 6/2018 | Gao | G06F 3/0421 |
| 10,175,822 | B2* | 1/2019 | Dearn | G06F 3/0416 |
| 2006/0279558 | A1* | 12/2006 | Van Delden | G02F 1/13338 345/176 |
| 2007/0152985 | A1* | 7/2007 | Ostergaard | G06F 3/0421 345/176 |
| 2008/0011944 | A1 | 1/2008 | Chua et al. | |
| 2008/0284925 | A1* | 11/2008 | Han | G06F 3/0425 349/12 |
| 2010/0302185 | A1* | 12/2010 | Han | G06F 3/042 345/173 |
| 2010/0302210 | A1 | 12/2010 | Han et al. | |
| 2011/0261300 | A1* | 10/2011 | Miyazaki | G06F 3/042 349/104 |
| 2012/0147298 | A1* | 6/2012 | Lai | G02F 1/133502 349/96 |
| 2012/0170072 | A1* | 7/2012 | Miyazaki | G02B 3/0068 358/1.13 |
| 2012/0268427 | A1 | 10/2012 | Slobodin | |
| 2013/0033450 | A1* | 2/2013 | Coulson | G06F 3/044 345/174 |
| 2013/0169593 | A1* | 7/2013 | Imamura | G06F 3/0412 345/174 |
| 2014/0055418 | A1* | 2/2014 | Hsieh | G06F 3/042 345/175 |
| 2014/0285727 | A1* | 9/2014 | Seo | G06F 3/0421 349/12 |
| 2015/0331546 | A1* | 11/2015 | Craven-Bartle | G02B 5/00 345/175 |
| 2017/0177107 | A1* | 6/2017 | Sha | G06F 3/042 |
| 2017/0220840 | A1* | 8/2017 | Wickboldt | G06K 9/0053 |
| 2017/0363905 | A1* | 12/2017 | Katsuta | G02B 5/00 |
| 2018/0004356 | A1* | 1/2018 | Sugiyama | G02B 6/0016 |
| 2018/0046837 | A1* | 2/2018 | Gozzini | G06K 9/0004 |

\* cited by examiner

LIGHT-SENSITIVE TYPE TOUCH PANEL, DISPLAY DEVICE AND TOUCH POSITIONING METHOD

TECHNICAL FIELD

At least one embodiment of the present disclosure relates to a light-sensitive type touch panel, a display device and a touch positioning method.

BACKGROUND

Currently, with constant development of various intelligent devices, a human-computer interaction mode has been developed from an original key mode to a touch mode.

An in-cell touch screen and an on-cell touch screen are two common touch screens, a touch sensor of the in-cell touch screen is arranged at the inside of a display panel included by the in-cell touch screen, and a touch sensor of the on-cell touch screen is arranged outside a display panel and is arranged on a substrate included by the display panel.

In addition, in the technical field of touch, touch screens include various types, e.g., a resistive type, a capacitive type, a light-sensitive type, an electromagnetic type or the like. A light-sensitive type touch screen, by arranging a light sensor, senses a light change caused by a touch operation so as to determine a position of the touch operation.

SUMMARY

At least one embodiment of the present disclosure provides a light-sensitive type touch panel, a display device and a touch positioning method, so as to reduce the false touch caused due to the reason that an object which is not a touch object reflects light.

At least one embodiment of the present disclosure provides a light-sensitive type touch panel, which includes: a support substrate; a first thin film, on the support substrate; a second thin film, which is on the support substrate, opposite to the first thin film in a direction perpendicular to the support substrate, and provided with a first surface close to the first thin film and a second surface away from the first thin film; a fluid layer, which is between the first thin film and the second thin film in the direction perpendicular to the support substrate, and adjacent to the first surface of the second thin film, and a refractive index of which is smaller than a refractive index of the second thin film; a light source, configured to emit incident light which is incident to the second thin film; and a light sensor, on a side, away from the second thin film, of the first thin film.

At least one embodiment of the present disclosure further provides a display device which includes the above light-sensitive type touch panel.

At least one embodiment of the present disclosure further provides a touch positioning method with includes: irradiating incident light to a second thin film which is on a support substrate and is opposite to a first thin film on the support substrate, so that the incident light travels in the second thin film in a case that the second thin film is not applied with a pressure, wherein in a direction perpendicular to the support substrate, a fluid layer is provided between the first thin film and the second thin film; applying a pressure to a preset position of the second thin film to enable a part of the incident light to emerge from a surface, which is in contact with the first thin film, of the second thin film, and to form emergent light; and determining the preset position by detecting the emergent light.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
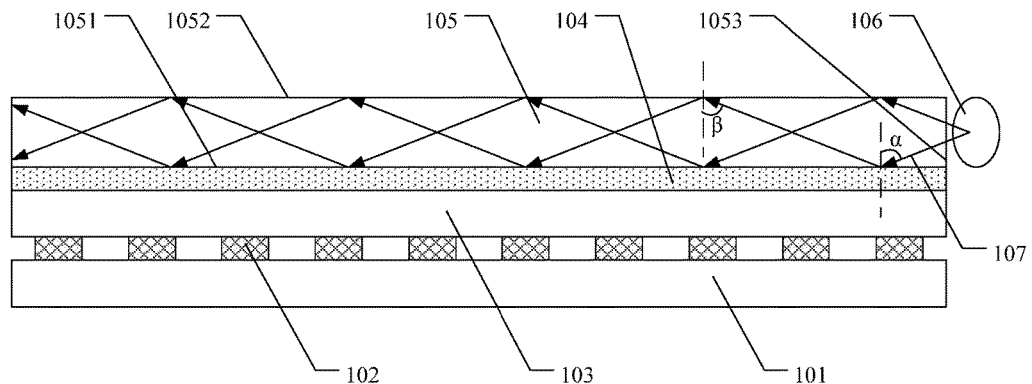
FIG. 1a is a sectional schematic view of a light-sensitive type touch panel provided by one embodiment of the present disclosure when no touch occurs.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A working principle of a currently-used light-sensitive type in-cell touch screen is that: the touch screen includes a display module which includes a display panel and a backlight source, a light sensor capable of sensing light with a set wavelength is formed on, for example, an array substrate of the display panel, a light source capable of emitting the light with the set wavelength can be arranged in the backlight source of the display module, and by using a touch object (e.g., a finger) capable of reflecting light, the light with the set wavelength is reflected to the light sensor on the array substrate so as to achieve a touch function. In research, inventors of the application noted that such a light-sensitive type touch panel usually may generate problems, which are caused due to an object which is not a touch object reflecting light, such as a false touch which is easily to occur.

In addition, in a currently-used light-sensitive type touch screen adopting an on-cell mode, a light source and a light sensor are arranged outside a display panel of the touch screen and are exposed in the air, and a touch function is achieved in a mode that a touch object blocks light irradiated to the light sensor. However, such a light-sensitive type touch screen is also easy to generate the problem of false touch.

Embodiments of the present disclosure provide a light-sensitive type touch panel, a display device and a touch positioning method. By touch, a first thin film and a second thin film which are respectively on two sides of a fluid layer are in contact with each other at a touch position, so that a part of light travelling in the second thin film can be sensed by a light sensor after being transmitted from the second thin film, thereby implementing touch positioning. A pressure needs to be applied by touch to enable the first thin film and the second thin film to be in contact with each other, and thus, the present disclosure can reduce false touch, which is caused due to the light reflection caused by an object which is not a touch object, in a common light-sensitive type in-cell touch panel.

The light-sensitive type touch panel, the display device and the touch positioning method which are provided by the embodiments of the present disclosure will be illustrated in connection with the drawings.

Figure 1B:
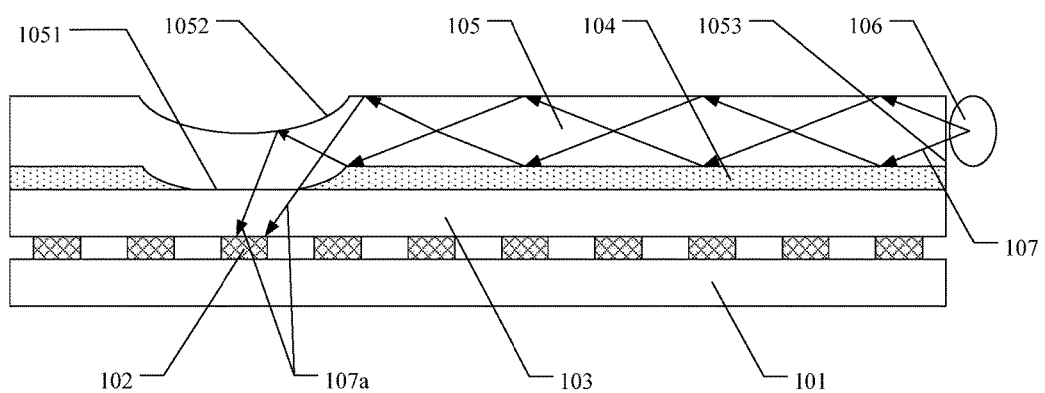
FIG. 1b is a sectional schematic view of the light-sensitive type touch panel provided by one embodiment of the present disclosure when a touch occurs.

At least one embodiment of the present disclosure provides a light-sensitive type touch panel. As shown in FIG. 1a and FIG. 1b, the light-sensitive type touch panel includes: a support substrate 101; a first thin film 103, arranged on the support substrate 101; a second thin film 105, arranged on the support substrate 101 and opposite to the first thin film 103 in a direction perpendicular to the support substrate 101; a fluid layer 104, arranged between the first thin film 103 and the second thin film 105 in the direction perpendicular to the support substrate 101; a light source 106, configured to emit incident light 107 to the second thin film 105; and a light sensor 102, arranged on a side, which is away from the second thin film 105, of the first thin film 103. In the light-sensitive type touch panel, the second thin film 105 has a first surface 1051 close to the first thin film 103 and a second surface 1052 away from the first thin film 103; and the fluid layer 104 is adjacent to the first surface 1051 of the second thin film 105, and a refractive index of the fluid layer 104 is smaller than a refractive index of the second thin film 105.

For example, the support substrate 101 may be a glass substrate, a quartz substrate or a plastic substrate or the like.

For example, materials of both the first thin film 103 and the second thin film 105 may be a resin material. For example, the resin material may include at least one of a polycarbonate material or a polymethyl methacrylate material.

For example, the fluid layer 104 may be an air layer. The fluid layer 104 also may be a fluid layer formed by other gas or liquid of which a refractive index is smaller than the refractive index of the second thin film 105.

As shown in FIG. 1a and FIG. 1b, the second thin film 105 has a lateral surface 1053, and an extension direction of the lateral surface 1053 intersects with extension directions of the first surface 1051 and the second surface 1052. The refractive index of the second thin film 105 is greater than the refractive index of the fluid layer 104, and thus, by enabling an incident angle α (not shown in FIG. 1b) for the incident light 107 emitted by the light source 106 to be incident to the first surface 1051 to be greater than or equal to a critical angle for the incident light 107 to be totally reflected at the first surface 1051, the total reflection of the incident light 107 on the first surface 1051 of the second thin film 105 can be implemented. For example, the second thin film 105 may adopt polymethyl methacrylate (PMMA), the fluid layer 104 may be an air layer, a refractive index of the PMMA is 1.49, a critical angle of the PMMA with respect to the air is 42.20, and thus, as long as the incident light 107 is incident to the first surface 1051 of the second thin film 105 at an incident angle greater than or equal to 42.2°, the incident light 107 can be totally reflected at the first surface 1051.

For example, the second surface 1052 can be set as a reflective surface (for example, the reflective surface is formed by coating a reflective material). Or, the incident light 107 may also be totally reflected at the second surface 1052. For example, by enabling an incident angle β for the incident light 107 to be incident to the second surface 1052 of the second thin film 105 to be greater than or equal to a critical angle for the incident light 107 to be totally reflected at the second surface 1052, the incident light 107 can be totally reflected at the second surface 1052.

For example, as shown in FIG. 1a and FIG. 1b, the first surface 1051 and the second surface 1052 of the second thin film 105 may be parallel to each other, which is beneficial for simplifying control on the incident angle α (not shown in FIG. 1b) for the incident light 107 to be incident to the first surface 1051.

It should be noted that the incident angle mentioned in the embodiments of the present disclosure refers to an angle between the incident light and a normal of a surface to which the incident light is incident; and the critical angle mentioned in the embodiments of the present disclosure refers to an incident angle when light is irradiated to an optically thinner medium from an optically denser medium and a refractive angle is 90°, and in this case, refracted light just does not appear in the optically thinner medium, so that total reflection occurs between the optically denser medium and the optically thinner medium.

In an embodiment of the present disclosure, as shown in FIG. 1a and FIG. 1b, the light sensor 102 is arranged on one side, which is away from the second thin film 105, of the first thin film 103. In this mode, in a case that a preset position (with reference to a concave portion in FIG. 1b) of the second thin film 105 is applied with a pressure, a part of the incident light 107 may form emergent light 107a after emerging from the second thin film 105 at the preset position, and the emergent light 107a may be at least partially sensed by the light sensor 102 after passing through the first thin film 103. Therefore, multipoint touch can be implemented. It should be noted that the preset position of the second thin film is a random position of the second thin film, which is applied with the pressure.

A working principle of the touch panel provided by the embodiments of the present disclosure will be illustrated in detail in connection with FIG. 1a and FIG. 1b.

As shown in FIG. 1a, in a case that no touch occurs on a side, which is away from the first thin film 103, of the second thin film 105, the second thin film 105 is separated from the first thin film 103 by the fluid layer 104, and the incident light 107 can travel between the first surface 1051 and the second surface 1052 of the second thin film 105 after being incident to the second thin film 105 (for example, being incident to the second thin film 105 from the lateral surface 1053 as shown in FIG. 1a), and be totally reflected at the first surface 1051.

As shown in FIG. 1b, in a case that a touch occurs at the preset position (with reference to the concave portion of the second thin film 105 in FIG. 1b) of the second thin film 105, at the preset position, the second thin film 105 deforms due to being applied with a pressure toward the first thin film 103 and then contacts the first thin film 103, i.e., an interface at the first surface of the second thin film 105 is changed into, for example, a resin-resin interface in a case that the touch occurs, from, for example, a resin-fluid interface in a case that no touch occurs, so that a part of the incident light 107 may be not totally reflected when being incident to the first surface 1051, and the part of the incident light 107 may emerge from the first surface and travel toward the first thin film 103, and the emergent light 107a emerging from the second thin film 105 is at least partially sensed by the light sensor 102 after transmitting the first thin film 103. Then, by a touch chip (not shown in FIG. 1b) in signal connection with the light sensor 102, a touch position can be determined so as to achieve a touch function.

In order to make the emergent light 107a easier to enter the first thin film 103 after emerging from the first surface 1051 of the second thin film 105, for example, a refractive index of the first thin film 103 may be greater than the refractive index of the fluid layer 104.

In order to further facilitate the emergent light 107a to enter the first thin film 103, for example, the refractive index of the first thin film 103 may be greater than or equal to the refractive index of the second thin film 105. In this case, when the second thin film 105 is in contact with the first thin film 103 due to the action of a touch pressure and fluidity of the fluid layer 104, the incident light 107 is not likely to be totally reflected at a contact interface (for example, the resin-resin interface) of the second thin film 105 and the first thin film 103 so as to benefit for enabling the emergent light 107a formed after the part of the incident light 107 emerges from the second thin film 105 to enter the first thin film 103.

Figure 2:
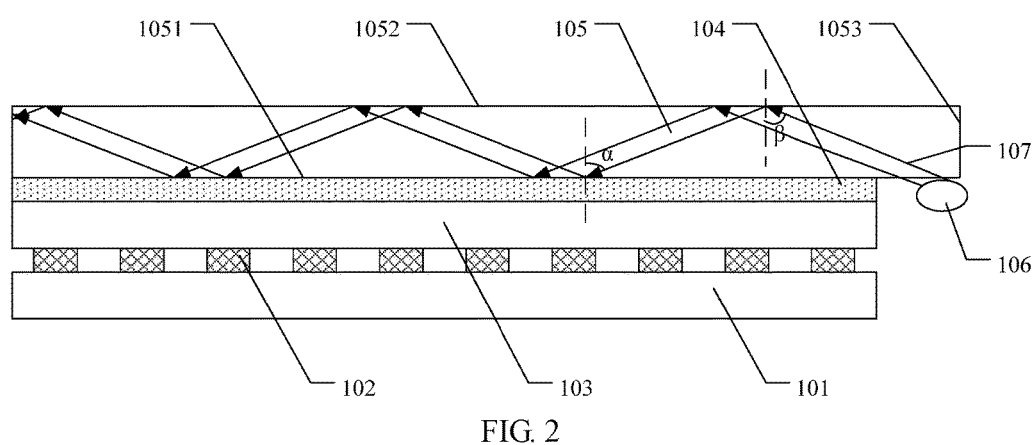
FIG. 2 is a sectional schematic view illustrating incident light emitted by a light source in a light-sensitive type touch panel provided by one embodiment of the present disclosure is incident to a second thin film from a first surface of the second thin film.

In the embodiments shown in FIG. 1a and FIG. 1b, the incident light 107 emitted by the light source 106 is incident to the second thin film 105 from the lateral surface 1053. For example, in this case, the light source 106 may be arranged on a side where the lateral surface 1053 of the second thin film 105 is positioned. Or, in another embodiment of the present disclosure, as shown in FIG. 2, the incident light 107 emitted by the light source 106 may be incident to the second thin film 105 from a position, which is close to the lateral surface 1053, of the first surface 1051.

In the embodiment of the present disclosure, a mode of enabling the incident light 107 to be incident to the second thin film 105 from the lateral surface 1053 or a position, which is close to the lateral surface 1053, of the first surface 1051 is beneficial for avoiding direct irradiation of the incident light 107 on the light sensor 102 in the case that no touch occurs; and the embodiment of the present disclosure preferably adopts a mode of enabling the incident light 107 to be incident from the lateral surface 1053 of the second thin film 105, which is beneficial for reducing the false touch caused by an object which is not a touch object reflecting light. Certainly, in at least one embodiment of the present disclosure, a mode of enabling the incident light to be incident from the second surface 1052 of the second thin film 105 may also be adopted.

It should be noted that the light source 106 may be arranged above the support substrate 101 or arranged below the support substrate 101, and in some embodiments, the light source 106 may adopt a light guiding apparatus (e.g., an optical fiber) to guide emitted light into the second thin film 105.

For example, the light source 106 may be an infrared light source, and correspondingly, the light sensor 102 may be an infrared sensor. When the light-sensitive type touch panel provided by the embodiments of the present disclosure is applied to a display device, by adopting the infrared light source and the infrared sensor, interference caused by a case that light emitted by other light sources (e.g., a backlight source in a liquid crystal display device or a light emitting component in an active light emitting display device) in the display device is received by the light sensor 102 can be avoided. Certainly, other light sources capable of emitting light with a preset wavelength can also be adopted, and correspondingly, the light sensor can sense the light with the preset wavelength.

For example, as shown in FIG. 1a and FIG. 1b, in the direction perpendicular to the support substrate 101, the light sensor 102 may be arranged between the support substrate 101 and the first thin film 103, which is beneficial for avoiding a case that the light sensor 102 influences the pressure generated by the touch to be applied to the thin film in an upper layer. Certainly, a mode of arranging the first thin film 103 in an upper layer and arranging the second thin film 105 in a lower layer (i.e., the second thin film 105 is arranged between the first thin film 103 and the support substrate 101) may also be adopted.

Figure 3A:
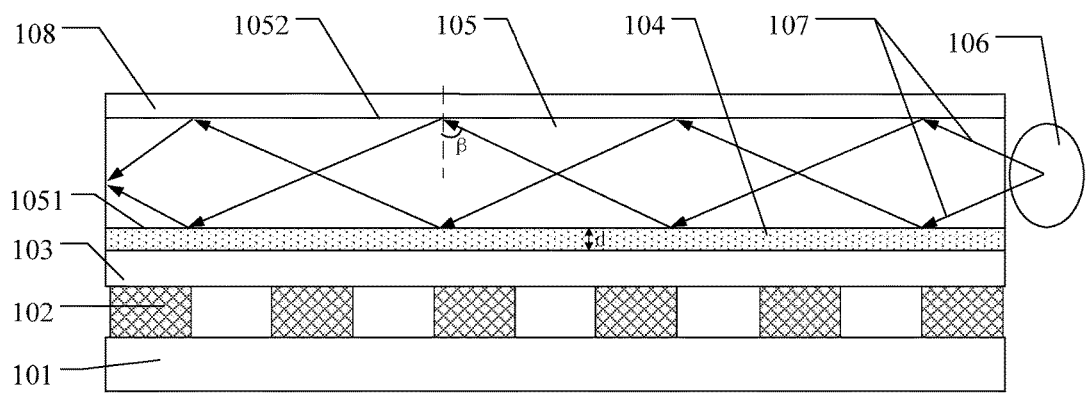
FIG. 3a is a sectional schematic view of a light-sensitive type touch panel with a covering layer, which is provided by one embodiment of the present disclosure, when no touch occurs.

In a case that the first thin film 103 covers the light sensor 102 and the second thin film 105 is arranged on one side, which is away from the light sensor 102, of the first thin film 103, for example, as shown in FIG. 3a, a light-sensitive type touch panel provided by at least one embodiment of the present disclosure may further include a covering layer 108, and a refractive index of the covering layer 108 is smaller than the refractive index of the second thin film 105. In this case, the incident light 107 can be guaranteed to be totally reflected at the second surface 1052 by enabling the incident angle $\beta$ for the incident light 107 to be incident to the second surface 1052 of the second thin film 105 to be greater than or equal to the critical angle for the incident light 107 to be totally reflected at the second surface 1052, so as to avoid a case that a part of the incident light 107 is incident to the covering layer 108 from the second surface 1052.

For example, in the light-sensitive type touch panel provided by at least one embodiment of the present disclosure, a material of the covering layer 108 may include a resin material. For example, the resin material may adopt polycarbonate (PC), polymethyl methacrylate (PMMA) or polyethylene terephthalate (PET) or the like, so long as the refractive index of the covering layer 108 is smaller than that of the second thin film 105.

In the embodiment of the present disclosure, the arrangement of the covering layer 108 can avoid direct contact between a touch object and the second thin film 105 so as to benefit for avoiding a case that the incident light emerges from the second surface 1052 of the second thin film 105 and towards a direction away from the light sensor 102.

Figure 3B:
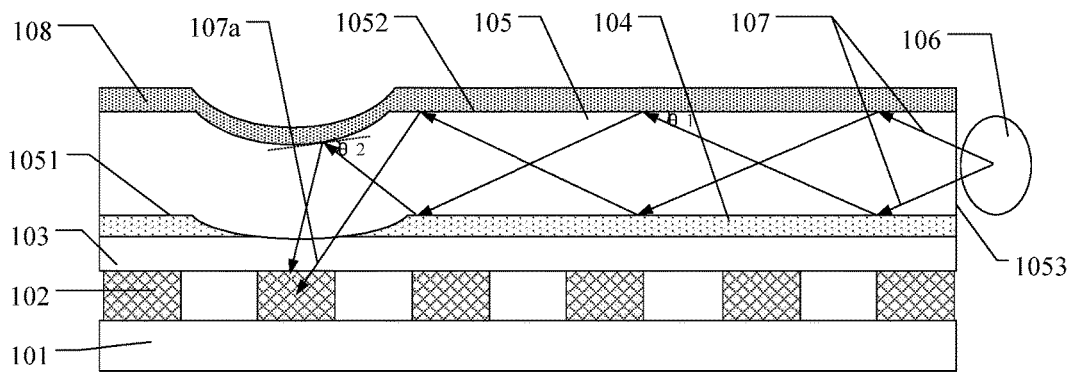
FIG. 3b is a sectional schematic view of the light-sensitive type touch panel with the covering layer, which is provided by one embodiment of the present disclosure, when a touch occurs.

For example, in the light-sensitive type touch panel provided by at least one embodiment of the present disclosure, in a case that the covering layer 108 is arranged, as shown in FIG. 3b, at a position, which is not applied with a pressure, of the second thin film 105, the incident light 107 is irradiated to the second surface 1052 at a first angle θ1 (with reference to the position of the second thin film 105, which is not applied with the pressure, in FIG. 3b) with respect to the second surface 1052 after being incident to the second thin film 105; and at a position (i.e., the preset position) of the second thin film, which position is applied with a pressure, a part of the incident light 107 has a second angle θ2 with respect to the second surface 1052, and a difference between the second angle θ2 and the first angle θ1 may be greater than or equal to 1° and smaller than or equal to 2°. Namely, at the preset position of the second thin film 105, a change quantity of an angle between the incident light 107 and the second surface 1052 of the second thin film 105 before and after the touch is from 1° to 2°. In this range, a case that the incident light 107 emerges from the second surface 1052 at the preset position of the second thin film 105 can be avoided.

For example, in the light-sensitive type touch panel provided by at least one embodiment of the present disclosure, a thickness d (as shown in FIG. 3a) of the fluid layer 104 may be smaller than or equal to 0.1 mm (millimeter). It should be noted that the thickness of the fluid layer 104 is not suitable to be too large so as to avoid a case that when a touch occurs, the second thin film 105 and the first thin film 103 are difficult to contact or avoid a case that due to a relatively large deformation generated by the second thin film 105, the incident light 107 emerges from the second surface 1052 of the second thin film 105. Certainly, by selecting a manufacturing material of the second thin film 105, the transmission thin film 105 can also generate a required deformation quantity after being touched.

Figure 4A:
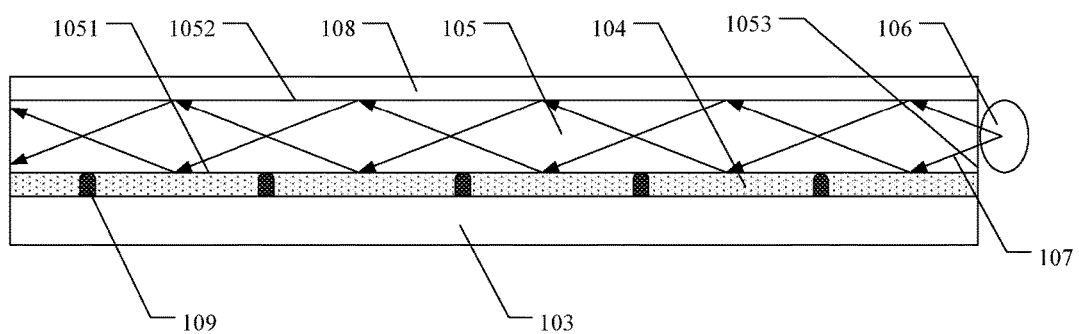
FIG. 4a is a sectional schematic view of a light-sensitive type touch panel with a spacer, which is provided by one embodiment of the present disclosure.

For example, as shown in FIG. 4a, the light-sensitive type touch panel provided by at least one embodiment of the present disclosure can further include a spacer 109 arranged between the first thin film 103 and the second thin film 105 in the direction perpendicular to the support substrate 101. The spacer 109 can be used for keeping a distance between the first thin film 103 and the second thin film 105 so as to benefit for enabling the second thin film 105 to be recovered to a state that the second thin film 105 is separated from the first thin film 103 after the touch is completed.

For example, the spacer 109 can adopt an elastic material, e.g., a resin or the like.

For example, in the light-sensitive type touch panel provided by at least one embodiment of the present disclosure, the spacer 109 may be lightproof. In this case, the emergent light emerging from the second thin film 105 can be adsorbed by the spacer 109 when being irradiated onto the spacer 109, so as to avoid the interference on touch positioning due to the spacer 109 changing the direction of the emergent light.

For example, in the light-sensitive type touch panel provided by at least one embodiment of the present disclosure, the refractive index of the second thin film 105 may be greater than the refractive index of the spacer 109. This can avoid the spacer 109 from affecting the total reflection state of the incident light 107 in the second thin film 105 on the first surface 1051.

Figure 4B:
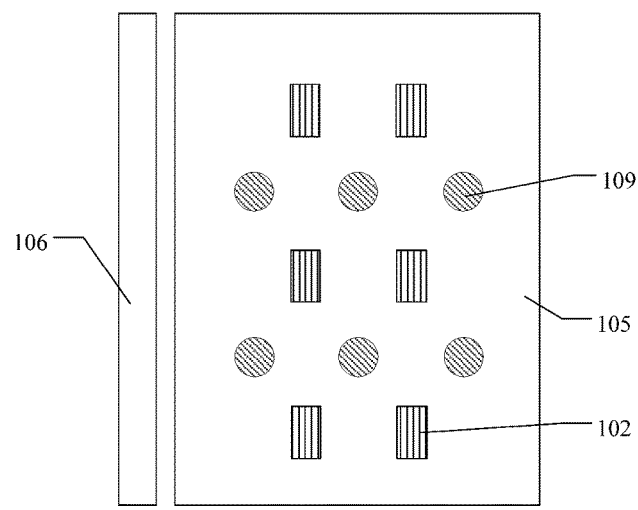
FIG. 4b is a plane schematic view of the light-sensitive type touch panel with the spacer, which is provided by one embodiment of the present disclosure.

For example, as shown in FIG. 4b, a plurality of spacers 109 can be provided. Certainly, an arrangement mode of the spacer 109 includes, but is not limited to, the embodiment shown in FIG. 4b.

In the embodiment shown in FIG. 4b, one light source 106 is arranged on one side of the second thin film 105, and a plurality of light sensors 102 are arranged on the support substrate 101. It should be noted that an arrangement mode of the light source 106 and the light sensor 102 includes, but is not limited to, the embodiment shown in FIG. 4b. For example, the number of the light sensor 102 may also be one, and for example, the light sensor 102 adopts an array type light sensor. In addition, separation distances between the light sensors 102 arranged in an array may be set according to requirements of touch accuracy.

For example, in any one of the embodiments of the present disclosure, the first thin film 103 and the second thin film 105 which are positioned on the light sensor 102, may be thin films (as shown in FIG. 4b) with a plane-shaped structure, or may also be thin films including a plurality of strip structures. When both the first thin film and the second thin film include a plurality of strip structures, a part of lateral surfaces of each strip structure may be coated with, for example, a reflective material or the like, so as to prevent a case that light which is incident into the strip structure emerges from the part of the lateral surfaces to cause a false touch. In addition, separation distances between these strip structures may be determined according to actually required touch accuracy.

At least one embodiment of the present disclosure further provides a display device including the light-sensitive type touch panel provided by any one of the embodiments.

Figure 5:
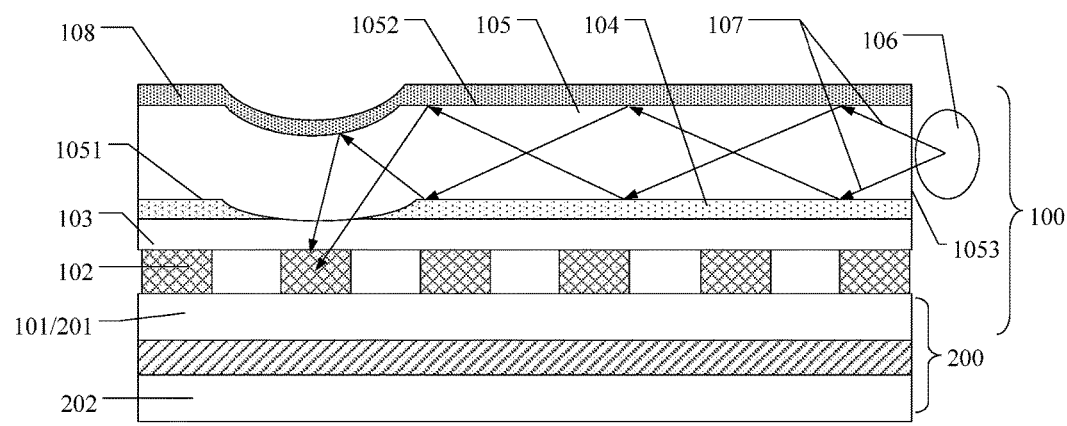
FIG. 5 is a sectional schematic view of a display device provided by one embodiment of the present disclosure.

For example, as shown in FIG. 5, the display device provided by at least one embodiment of the present disclosure further includes a display panel 200. The display panel 200 includes a first substrate 201 and a second substrate 202 which are opposite to each other, and the first thin film 103, the fluid layer 104 and the second thin film 105 of the touch panel 100 can be arranged on a side, which is away from the second substrate 202, of the first substrate 201. In this case, the first substrate 201 can be used as the above support substrate 101, i.e., the display device can be an on-cell touch screen.

In FIG. 5, illustration is carried out by taking a case that the light-sensitive type touch panel 100 and the display panel 200 are arranged in a laminated mode and a touch occurs on a side, which is away from the first thin film 103, of the second thin film 105, as an example. The display device provided by the embodiment of the present disclosure includes, but is not limited to, the embodiment shown in FIG. 5.

Figure 6:
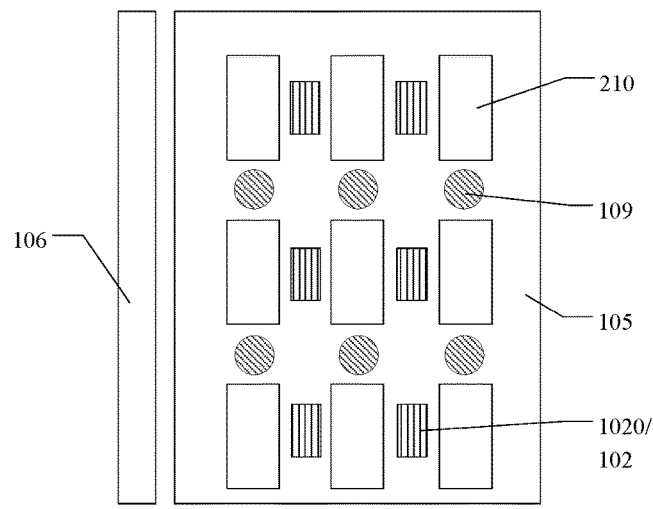
FIG. 6 is a plane schematic view of the display device provided by one embodiment of the present disclosure.

For example, as shown in FIG. 6, the display panel includes a plurality of pixel opening regions 210 arranged in a matrix, light for displaying an image can emerge from the pixel opening regions 210, and a periphery of each pixel opening region 210 is a non-display region.

For example, in the display device provided by at least one embodiment of the present disclosure, as shown in FIG. 6, the light sensor 102 may include a plurality of sub-sensors 1020 distributed in a matrix, the plurality of sub-sensors 1020 may be distributed on the peripheries (i.e., the non-display regions) of the pixel opening regions 210 so as to avoid the influence on display and avoid the influence on identification of a touch position due to a case that the light emerging from the pixel opening regions 210 and used for displaying the image is incident to the light sensor 102 of the light-sensitive type touch panel.

For example, the light-sensitive type touch panel 100 may include a plurality of spacers 109, and these spacers 109 may be distributed on the peripheries of the pixel opening regions 210 so as to avoid the influence on image display.

In the display device provided by the embodiments of the present disclosure, arrangement modes of other structures of the light-sensitive type touch panel 100 can refer to the above embodiments related to the light-sensitive type touch panel, and are not repeated herein.

The display device provided by the embodiments of the present disclosure can be any product or component with a display function, e.g., a liquid crystal panel, an electronic paper, an organic light-emitting diode (OLED) panel, a mobile phone, a tablet computer, a television, a display, a notebook computer, a digital photo frame, a navigator and the like.

At least one embodiment of the present disclosure further provides a touch positioning method, which includes the step S71 to the step S73. Illustration will be carried out by taking a case of applying the touch positioning method to the light-sensitive type touch panel as shown in FIG. 1a and FIG. 1b as an example.

Step S71: irradiating incident light 107 to a second thin film 105 which is on a support substrate 101 and opposite to a first thin film 103 which is on a support substrate 101, so that the incident light 107 travels in the second thin film 105. In this step, in a direction perpendicular to the support substrate 101, a fluid layer 104 is arranged between the first thin film 103 and the second thin film 105.

In this step, positions of the first thin film 103 and the second thin film 105 can be exchanged.

Step S72: applying a pressure to a preset position (referring to a concave portion in FIG. 1b) of the second thin film 105 to enable a part of the incident light 107 to form emergent light 107a after being transmitted from a surface (with reference to a first surface 1051 of the second thin film 105 at the preset position in FIG. 1b), which is in contact with the first thin film 103, of the second thin film 105.

Step S73: determining the preset position by detecting the emergent light 107a.

Arrangement of structures of the first and second thin films, the fluid layer and other structures can refer to related descriptions in the embodiments of the light-sensitive type touch panel, and is not repeated herein.

In summary, the embodiments of the present disclosure provide a light-sensitive type touch panel, a display device including the light-sensitive type touch panel and a touch positioning method. Compared to a currently-used light-sensitive type in-cell touch screen and the on-cell touch screen which enables a light source and a light sensor to be exposed in the air and achieves touch identification by blocking light, in the solution provided by the embodiments of the present disclosure, the pressure needs to be applied to enable the first and second thin films to be in contact so as to change a light path, and thus, a problem of false touch caused due to an object which is not a touch object reflecting light is not easy to generate.

Moreover, compared to the currently-used light-sensitive type touch screen adopting the on-cell mode, the embodiments of the present disclosure further have the advantages that: (1) the light emitted by the light source does not pass through the touch object, e.g., a finger or the like, and thus, power consumption is low; (2) the light source and the light sensor do not need to be exposed in the air, and thus, the light source and the light sensor are not easy to be damaged, and falling resistance is higher, and (3) a multi-point touch can be implemented.

There are the following points to be noted: (1) in the drawings of the embodiments of the present disclosure, only the structures related to the embodiments of the present disclosure are referred to, and other structures may be referred to conventional designs; (2) the thicknesses of layers or regions in the drawings used to describe the embodiments of the present disclosure are enlarged for the purpose of clarity; and (3) in the case of no conflict, the features of the embodiments and the embodiments of the present disclosure may be combined with each other.

What are described above is related to the illustrative embodiments of the disclosure only and not limitative to the scope of the disclosure; the scopes of the disclosure are defined by the accompanying claims.

This application claims the benefit of Chinese Patent Application No. 201610133263.9, filed on Mar. 9, 2016, which is hereby entirely incorporated by reference as a part of the present application.

What is claimed is:

1. A light-sensitive type touch panel, comprising:
a support substrate;
a first thin film, on the support substrate;
a second thin film, which is on the support substrate, opposite to the first thin film in a direction perpendicular to the support substrate, and provided with a first surface close to the first thin film and a second surface away from the first thin film;
a fluid layer, which is between the first thin film and the second thin film in the direction perpendicular to the support substrate, and adjacent to the first surface of the second thin film, wherein a refractive index of the fluid layer is smaller than a refractive index of the second thin film;
a light source, configured to emit incident light which is incident to the second thin film; and
a light sensor, on a side, away from the second thin film, of the first thin film,
wherein
in absence of pressure being applied to a preset position of the second thin film, the incident light falls on the second surface at a first angle with respect to the second surface after the incident light is incident to the second thin film; and
in presence of pressure being applied to the preset position of the second thin film, a second angle is formed between a part of the incident light and the second surface, and a difference between the second angle and the first angle is greater than or equal to 1° and smaller than or equal to 2°.

2. The light-sensitive type touch panel according to claim 1, wherein a refractive index of the first thin film is greater than the refractive index of the fluid layer.

3. The light-sensitive type touch panel according to claim 2, wherein the refractive index of the first thin film is greater than or equal to the refractive index of the second thin film.

4. The light-sensitive type touch panel according to claim 1, wherein
the second thin film further comprises a lateral surface, and an extension direction of the lateral surface intersects with both an extension direction of the first surface and an extension direction of the second surface; and the light source is configured to enable the incident light to be incident to the second thin film from the lateral surface or from a position, close to the lateral surface, of the first surface.

5. The light-sensitive type touch panel according to claim 1, wherein the first surface is parallel to the second surface.

6. The light-sensitive type touch panel according to claim 1, wherein in absence of pressure being applied to the second thin film, the incident light is configured to travel between the first surface and the second surface of the second thin film, and is totally reflected on the first surface.

7. The light-sensitive type touch panel according to claim 1, wherein in presence of pressure being applied to a preset position of the second thin film, a part of the incident light forms emergent light after emerging from the preset position, and the emergent light is at least partially sensed by the light sensor after passing through the first thin film.

8. The light-sensitive type touch panel according to claim 1, wherein in the direction perpendicular to the support substrate, the light sensor is between the support substrate and the first thin film.

9. The light-sensitive type touch panel according to claim 8, wherein, the second surface of the second thin film is a reflective surface.

10. The light-sensitive type touch panel according to claim 8, further comprising:
a covering layer covering the second thin film, wherein a refractive index of the covering layer is smaller than the refractive index of the second thin film.

11. The light-sensitive type touch panel according to claim 10, wherein
the light source is configured to enable an incident angle for the incident light to be incident to the second surface to be greater than or equal to a critical angle for the incident light to be totally reflected on the second surface.

12. The light-sensitive type touch panel according to claim 1, wherein a thickness of the fluid layer is smaller than or equal to 0.1 mm.

13. The light-sensitive type touch panel according to claim 1, further comprising:
a spacer, between the first thin film and the second thin film in the direction perpendicular to the support substrate.

14. The light-sensitive type touch panel according to claim 13, wherein the spacer is lightproof.

15. The light-sensitive type touch panel according to claim 1, comprising:
a spacer, between the first thin film and the second thin film in the direction perpendicular to the support substrate,
wherein the spacer is in direct contact with the first thin film and the second thin film, and a refractive index of the spacer is smaller than the refractive index of the second thin film.

16. The light-sensitive type touch panel according to claim 1, wherein the light source is an infrared light source, and the light sensor is an infrared sensor.

17. A display device, comprising the light-sensitive type touch panel according to claim 1.

18. The display device according to claim 17, further comprising:
a display panel, comprising a first substrate and a second substrate which are opposite to each other, wherein the first thin film, the fluid layer and the second thin film of the light-sensitive type touch panel are on a side which is away from the second substrate, of the first substrate.

19. A touch positioning method, comprising:
irradiating incident light to a second thin film which is on a support substrate, is opposite to a first thin film on the support substrate and is provided with a first surface close to the first thin film and a second surface away from the first thin film, so that the incident light travels in the second thin film in absence of pressure being applied to the second thin film, wherein in a direction perpendicular to the support substrate, a fluid layer is provided between the first thin film and the second thin film;
applying a pressure to a preset position of the second thin film to enable a part of the incident light to emerge from the first surface, which is in contact with the first thin film, of the second thin film, and to form emergent light; and
determining the preset position by detecting the emergent light,
wherein
in absence of pressure being applied to a preset position of the second thin film, the incident light falls on the second surface at a first angle with respect to the second surface after the incident light is incident to the second thin film; and
in presence of pressure being applied to the preset position of the second thin film, a second angle is formed between a part of the incident light and the second surface, and a difference between the second angle and the first angle is greater than or equal to 1° and smaller than or equal to 2°.

\* \* \* \* \*